US008829866B2

(12) United States Patent
Lethellier (10) Patent No.: US 8,829,866 B2
(45) Date of Patent: Sep. 9, 2014

(54) DC TO DC CONVERTER DESIGNED TO MITIGATE PROBLEMS ASSOCIATED WITH LOW DUTY CYCLE OPERATION

(75) Inventor: Patrice Lethellier, Sunnyvale, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 467 days.

(21) Appl. No.: 13/325,562

(22) Filed: Dec. 14, 2011

(65) Prior Publication Data

US 2013/0154589 A1 Jun. 20, 2013

(51) Int. Cl.
*G05F 1/56* (2006.01)
*G05F 1/70* (2006.01)

(52) U.S. Cl.
USPC ........... 323/222; 323/223; 323/224; 323/259; 323/266; 323/282; 323/284; 323/285; 323/286

(58) Field of Classification Search
CPC .. H02M 3/156; H02M 3/1582; H02M 3/1588
USPC ......... 323/222, 223, 224, 259, 266, 282, 284, 323/285, 286
See application file for complete search history.

(56) References Cited

U.S. PATENT DOCUMENTS

| 7,714,547 | B2* | 5/2010 | Fogg et al. ............... | 323/224 |
|---|---|---|---|---|
| 7,804,282 | B2* | 9/2010 | Bertele .................... | 323/222 |
| 8,164,319 | B2* | 4/2012 | Bodano et al. ........... | 323/284 |
| 8,319,483 | B2* | 11/2012 | Fishelov et al. .......... | 323/271 |
| 8,723,497 | B2* | 5/2014 | Yen et al. ................. | 323/283 |
| 2002/0118556 | A1* | 8/2002 | Johnson, Jr. ............. | 363/123 |
| 2006/0176037 | A1* | 8/2006 | Flatness et al. .......... | 323/282 |
| 2006/0226822 | A1* | 10/2006 | Xu et al. .................. | 323/283 |
| 2007/0053217 | A1* | 3/2007 | Darroman ................ | 363/62 |
| 2008/0136387 | A1* | 6/2008 | Bertele .................... | 323/282 |
| 2010/0079122 | A1* | 4/2010 | Bodano et al. ........... | 323/282 |
| 2011/0101951 | A1* | 5/2011 | Zhang et al. ............. | 323/305 |

OTHER PUBLICATIONS

Reusch, et al., "Three Level Buck Converter with Control and Soft Startup", IEEE, No. 978-1-4244-2893-9/09, pp. 31-35, 2009.

* cited by examiner

*Primary Examiner* — Bao Q Vu
(74) *Attorney, Agent, or Firm* — Weaver Austin Villeneuve & Sampson LLP (57) ABSTRACT

DC to DC converters are described that include two converters interconnected and operated to mitigate at least some of the effects of low duty cycle operation.

20 Claims, 9 Drawing Sheets

DC TO DC CONVERTER DESIGNED TO MITIGATE PROBLEMS ASSOCIATED WITH LOW DUTY CYCLE OPERATION

BACKGROUND OF THE INVENTION

The present invention relates generally to switching power supplies and, according to some embodiments, to DC to DC converters designed to mitigate one or more of the issues associated with low duty cycle operation.

Voltage regulators and other power supplies, such as direct current (DC) to DC converters, are used to provide stable voltage or current sources for electronic devices and systems. The typical purpose of a voltage regulator is to convert a source voltage, such as the voltage of an alternating current (AC) or DC power source, into the operating DC voltage of an electronic device. Switching voltage regulators, often referred to as "switching regulators," are a type of DC to DC converter that convert one DC voltage to another DC voltage with high efficiency. A switching regulator generates an output voltage by converting an input DC voltage into a high frequency voltage, and filtering the high frequency voltage to produce the output DC voltage.

Conventional switching regulators typically include a switch for alternately coupling and decoupling an input DC voltage source (which may be unregulated), such as a battery, to a load, such as an integrated circuit. An output filter, typically including an inductor and a capacitor, is coupled between the switch and the load to filter the output of the switch and thus provide the output DC voltage. The switching regulator operates on the principle of storing energy in the inductor during one portion of a cycle and then transferring the stored energy to the capacitor and the load in the next portion of the cycle. The output filter serves to attenuate any ripple to an acceptable value at the output.

DC to DC converters employing Buck topologies (also referred to as Buck converters) convert an input DC voltage to a lower output DC voltage of the same polarity, and are widely used to step down voltages in diverse applications. In many of these applications the magnitude of the step down from the input voltage to the output voltage has continued to increase with each successive generation of products, pushing the limits of the conventional Buck topology. As will be understood by those of skill in the art, the greater the step down, the lower the operating duty cycle of the Buck converter, i.e., the portion of the operating cycle of the converter during which the input voltage is coupled to the load. For example, applications with a 12 VDC input may now need to be stepped down to operating voltages of 0.4 or even 0.25 VDC. This size of a step, along with the typical requirement that the output voltage be brought up in a controlled manner at system start up, results in operating duty cycles lower than 1%.

Low operating duty cycles can be problematic for Buck converters from a noise perspective as the switching noise associated with the rising edge of the conduction interval of the high-side switch does not have time to dampen entirely before the switch is turned off. This commutation noise introduces noise artifacts in the output voltage of the converter, undermining the goal of a smooth, controlled start up. Such artifacts may be unacceptable, for example, in applications in which previously stored system information must be preserved during start up.

One approach could be to introduce a transformer to handle a portion of the step down, thereby allowing the Buck converter to operate with a higher duty cycle. However, in addition to undermining the simplicity of a Buck topology, the introduction of a step-down transformer may unacceptably reduce system performance and efficiency.

SUMMARY OF THE INVENTION

According to a particular class of embodiments, a DC to DC converter is provided for converting an input voltage, Vin, to an output voltage, Vout. The DC to DC converter includes first and second converters. The first converter has a modified Buck topology including a first high-side switch, a first low-side switch, and a tank capacitor. The tank capacitor is disposed in between and in series with the first high-side switch and the first low-side switch. The first converter is configured to charge the tank capacitor when the first high-side switch is conducting. The second converter has a Buck topology including a second high-side switch and a second low-side switch. The second converter is configured to discharge the tank capacitor when the second high-side switch is conducting. Operation of the first and second converters is non-overlapping, and the first and second converters are interconnected such that each is subjected to an effective input voltage lower than Vin.

According to another class of embodiments, a DC to DC converter is provided for converting an input voltage, Vin, to an output voltage, Vout. The DC to DC converter includes first and second converters. The first converter has a modified Buck topology including a first high-side switch, a first low-side switch, and an energy storage tank configured to operate at a potential of about Vin/2. The energy storage tank is disposed in between and in series with the first high-side switch and the first low-side switch. The second converter has a Buck topology including a second high-side switch and a second low-side switch. Operation of the first and second converters is non-overlapping, and the first and second converters are interconnected such that each is subjected to an effective input voltage of about Vin/2.

According to yet another class of embodiments, a DC to DC converter is provided for converting an input voltage, Vin, to an output voltage, Vout. The DC to DC converter includes N parallel phases. Each of the N parallel phases includes first and second converters. The first converter has a modified Buck topology including a first high-side switch, a first low-side switch, and an energy storage tank configured to operate at a potential of about Vin/2. The energy storage tank is disposed in between and in series with the first high-side switch and the first low-side switch. The second converter has a Buck topology including a second high-side switch and a second low-side switch. Operation of the first and second converters of each of the N parallel phases is non-overlapping. The first and second converters of each of the N parallel phases are interconnected such that each is subjected to an effective input voltage of about Vin/2. Conduction intervals of the high-side switches of the respective N parallel phases are substantially evenly distributed over 360 degrees.

According to still another class of embodiments, a DC to DC converter is provided for converting an input voltage, Vin, to an output voltage, Vout. The DC to DC converter includes two parallel phases. Each of the two parallel phases includes first and second converters. The first converter has a modified Buck topology including a first high-side switch, a first low-side switch, and an energy storage tank configured to operate at a potential of about Vin/2. The energy storage tank is disposed in between and in series with the first high-side switch and the first low-side switch. The second converter has a Buck topology including a second high-side switch and a second low-side switch. The first converter includes a first inductor and the second converter includes a second inductor.

The first and second inductors are magnetically coupled to each other. Operation of the first and second converters of each of the two parallel phases is non-overlapping. The first and second converters of each of the two parallel phases are interconnected such that each is subjected to an effective input voltage of about Vin/2. Operation of the two parallel phases is independently controlled.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Various embodiments of the invention relate to DC to DC converters. Embodiments are generally described herein in relation to DC to DC converters that employ Buck topologies (also referred to as Buck converters) and modified Buck topologies which convert an input DC voltage to a lower output DC voltage of the same polarity. It should be understood, however, that embodiments are contemplated in which other topologies are employed in various combinations. For example, some embodiments also may include converters with topologies similar to boost topologies. The present invention should therefore not be limited by references to specific topologies herein.

DC to DC converters constructed in accordance with embodiments of the present invention incorporate a power switch. In some implementations, the power switch includes a "high-side" switch component. The high-side switch component is generally coupled to an input supply voltage, that is, an input voltage source, to be converted and/or regulated. In some implementations, the power switch also includes a "low-side" switch component. As will be understood by those of skill in the art, a wide range of devices may be used to implement the power switch and/or the high-side and low-side switch components of a DC to DC converter including a wide range of transistors and diodes.

In some contexts, the power switch is simply referred to as a "switch" or "switching circuit(ry)." Also, an individual high-side or low-side switch component can be referred to herein as a high-side or low-side "switch." Also, as used herein, "power switch" can sometimes refer to the individual high-side switch or low-side switch component. The terms, "switch component" and "switch," are generally intended to encompass one or more transistors, diodes, and/or other circuit elements configured to perform the described coupling and de-coupling of the output filter to a first voltage (e.g., the input voltage source to be converted and/or regulated), alternating with coupling and de-coupling to a second voltage such as ground.

In some embodiments, the power switch is configured in a way such that it alternately couples the output filter to the input voltage source and a second voltage, which is often ground. According to specific embodiments, the high-side switch selectively couples the output filter to the input voltage, while the low-side switch selectively couples the output filter to ground. The ratio of time spent with the "high-side" switch enabled versus the "low-side" switch enabled (i.e., the duty cycle) determines the output voltage developed, for instance, by an output LC filter coupled at the outputs of both the high-side and low-side switches.

Specific embodiments of the invention relate to a DC to DC converter that includes two converters (e.g., one having a Buck topology and the other having a modified Buck topology) that are interconnected in such a way so at to reduce the voltage (relative to the input voltage) to which the load is coupled by each of the converters, and in which both converters employ a common reference voltage. This lower voltage enables a corresponding increase in the operating duty cycle of the DC to DC converter while still achieving the step down achieved by conventional topologies with lower duty cycles.

Figure 1:
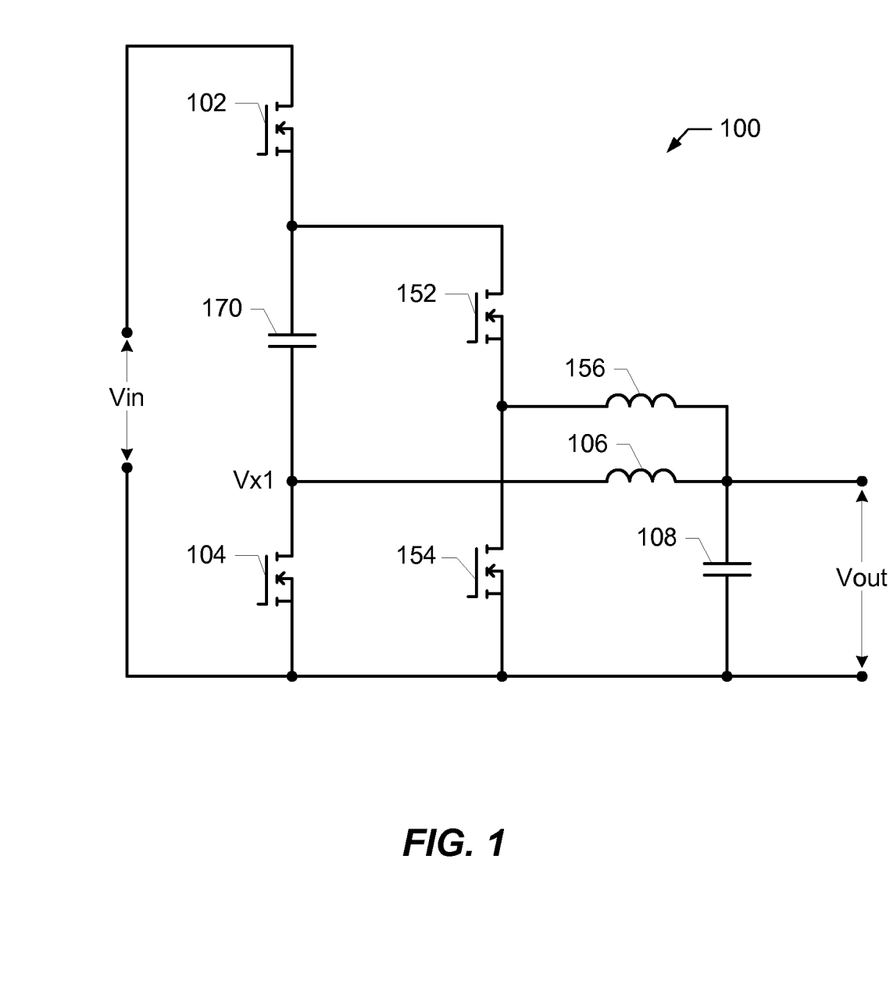
FIG. 1 is a simplified schematic diagram of a DC to DC converter according to a specific embodiment.

FIG. 1 is a simplified schematic of a specific implementation of a DC to DC converter 100 configured to convert an input voltage Vin to an output voltage Vout. DC to DC converter 100 includes a first converter that includes high-side switch 102, low-side switch 104, and a first output filter (inductor 106 and capacitor 108), and a second converter that includes high-side switch 152, low-side switch 154, and a second output filter (inductor 156 and capacitor 108). As will be appreciated, the second converter in this implementation employs a conventional Buck topology. By contrast, the first converter employs a modified Buck topology in which an energy storage tank 170 (in this example settling at a voltage of Vin/2) is inserted between and in series with high-side switch 102 and low-side switch 104. According to the specific implementation shown in FIG. 1, energy storage tank 170 is a tank capacitor which balances at Vin/2. Alternatively, energy storage tank 170 could be, for example, a battery.

During the conduction interval for high-side switch 102 the first converter operates to charge tank capacitor 170 to about Vin/2. Thus, the voltage at node Vx1 settles at about Vin−Vin/2=Vin/2. During the conduction interval for high-side switch 152 the second converter operates to discharge tank capacitor 170. Thus, each converter has an input voltage of about Vin/2 as its effective input voltage, and both voltages are relative to the same reference. Operation of DC to DC converter 100 may be understood with reference to FIG. 2 in which the different current paths for the converters are illustrated. The control circuitry for DC to DC converter 100 is not shown to avoid obscuring the more important aspects of the described embodiments. It will be understood that any of a wide variety of control circuitry designs and techniques known to those of skill in the art may be employed to achieve the switch drive control schemes necessary to implement these embodiments.

Figure 2:
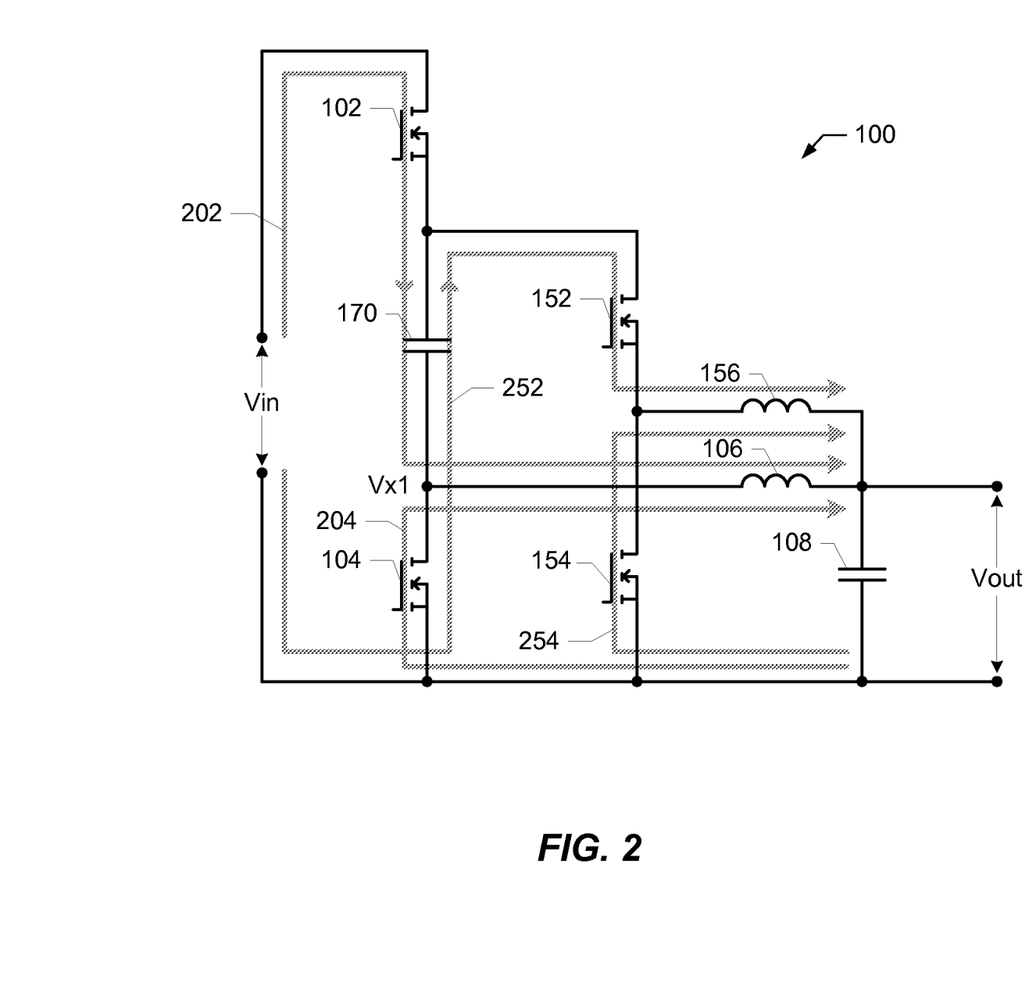
FIG. 2 illustrates operation of the DC to DC converter of FIG. 1.

Current path 202 corresponds to the conduction interval for high-side switch 102, current path 204 to the conduction interval for low-side switch 104, current path 252 to the conduction interval for high-side switch 152, and current path 254 to the conduction interval for low-side switch 154. The conduction intervals of high-side switches 102 and 152 are illustrated in waveforms 302 and 304 of FIG. 3, respectively, relative to a waveform 306 for a conventional Buck converter that achieves the same step-down conversion with two parallel phases. As shown, the high-side switch conduction intervals for DC to DC converter 100 are twice those of the Buck converter represented by waveform 306. Thus, such a design mitigates the effects of commutation noise relative to conventional designs. Alternatively, using the same effective duty cycle as a conventional Buck converter, the illustrated embodiment can improve the step down ratio by a factor of 2.

Figure 3:
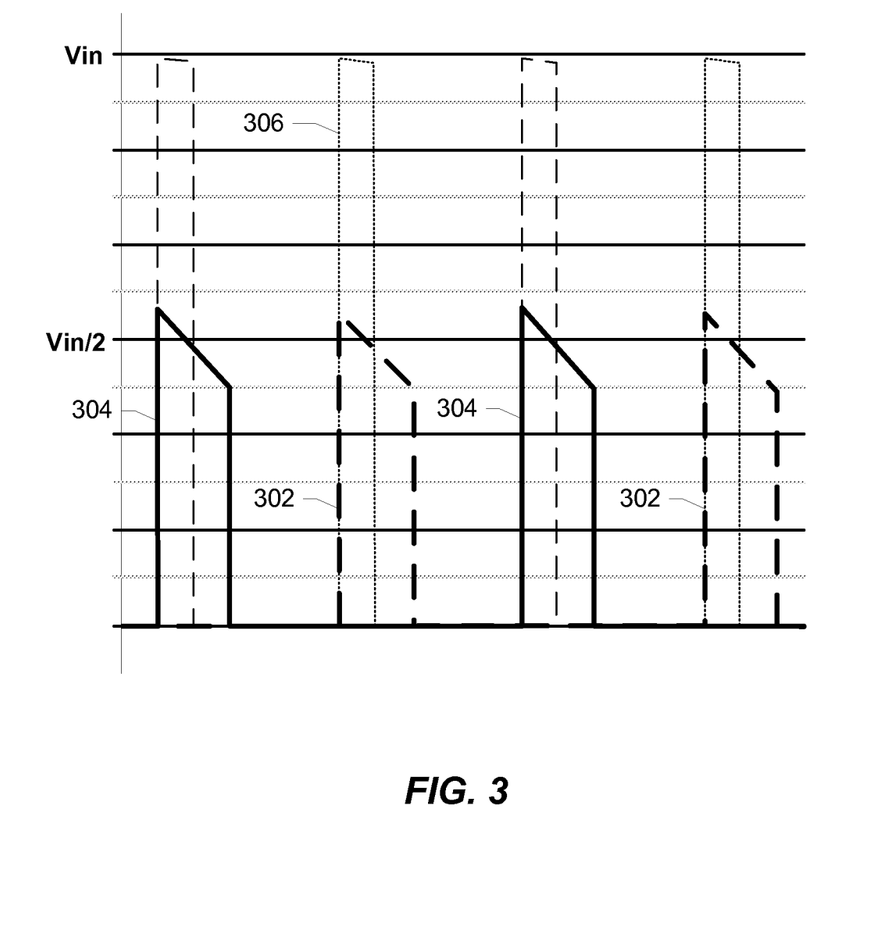
FIG. 3 is a graph including waveforms representing operation of the DC to DC converter of FIG. 1.

As is also shown in FIG. 3, the two converters included in DC to DC converter 100 operate about 180 degrees out of phase with each other. Those of skill in the art will understand that this phase relationship is advantageous for ripple cancellation. However, it should also be understood that implementations are contemplated in which the phase relationship between the two converters varies from 180 degrees. That is, as long as the conduction intervals of the respective high-side switches do not overlap, at least some of the advantages associated with various embodiments of the invention may be realized. Therefore, such implementations are within the scope of the present invention.

According to specific embodiments, the energy storage tank (e.g., the tank capacitor of FIGS. 1 and 2) in series with the switches of the first converter is brought up to its balance voltage (e.g., Vin/2) in a controlled manner at start up (e.g., using a soft drive and a dV/dt control) to ensure a controlled and monotonic transition of the output voltage of the DC to DC converter to the desired output level. According to some of these embodiments, the energy storage tank may be brought to the balance voltage before operation of the DC to DC converter begins. According to others of these embodiments, the energy storage tank may be brought to its balance voltage simultaneous with commencement of the operation of the DC to DC converter. As will be understood, reaching this balance voltage in a controlled manner may be achieved using a wide variety of mechanisms known to those of skill in the art.

An advantage associated with some embodiments of the invention relates to the fact that each of the converters in the DC to DC converter operates at a lower effective input voltage than the input voltage to which the DC to DC converter as a whole is subjected. As a result, a lower voltage semiconductor process may be used to fabricate the switches of which the DC to DC converter is constructed. For embodiments in which the voltage is reduced in half (e.g., from 12 VDC to 6 VDC), this may result in a reduction in the on state resistance (Rdson) of these switches by up to a factor of four.

Figure 4:
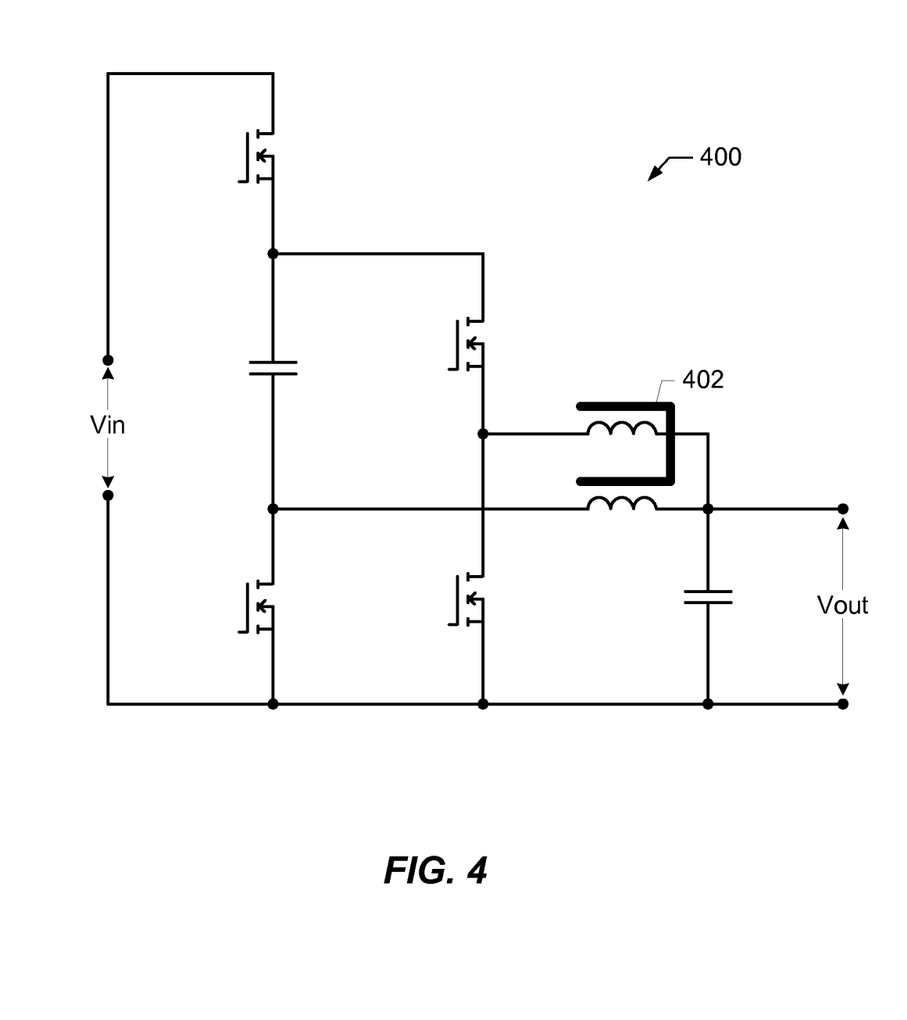
FIG. 4 is a simplified schematic diagram of a DC to DC converter according to another specific embodiment.

According to further embodiments, one of which is illustrated in FIG. 4, significant ripple cancellation advantages may be achieved through the use of coupled inductors (represented by core 402). According to such embodiments, if the inductors for the two converters of DC to DC converter 400 are magnetically coupled (e.g., by wrapping the windings around the same core, or around cores magnetically coupled to each other), the benefits of ripple cancellation may be extended to the inductor windings and the high and low-side switches. That is, because the inductors are magnetically coupled, a change in current in one of the windings induces a corresponding change in current in the other winding. By magnetically coupling the inductors, ripple cancellation (and corresponding reductions in AC conduction losses) is achieved in the inductors, the power switches, layout copper, and any of the converter components instead of just at the output capacitor. This, in turn, allows for the switches to be operated at lower frequency and/or lower current ripple and/or smaller inductor value to decrease the power loss, size and/or cost of the converter than is possible without coupling. According to various embodiments, the coupling is inverse magnetic coupling, i.e., assuming the currents in both converters have the same direction, the magnetic flux from one winding opposes the magnetic flux from the other.

Figure 5:
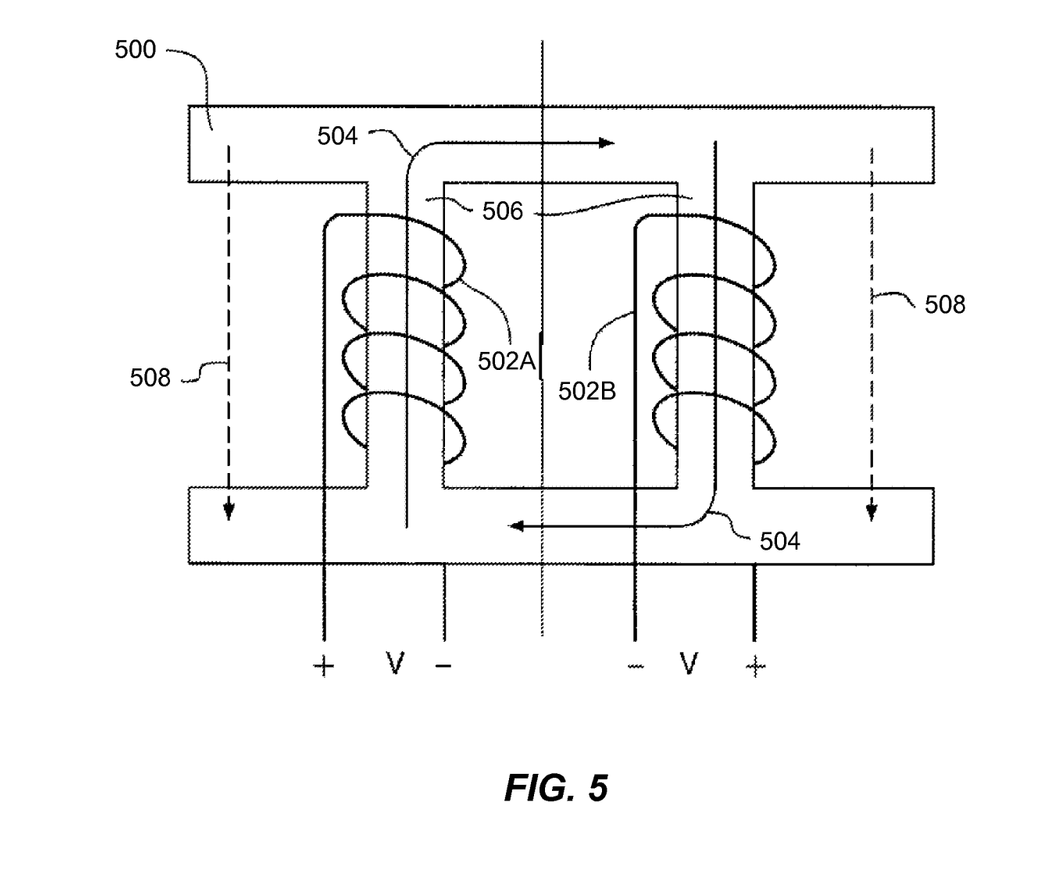
FIG. 5 is a simplified representation of an example of magnetically coupled inductors that may be employed with specific embodiments.

FIG. 5 illustrates an example in which inductors are magnetically coupled. A magnetic core 500 and windings 502A, 502B are arranged such that the core has a square shape, including core legs or rungs 506. Windings 502A and 502B are excited with equal voltage magnitudes, but with opposite signs, so that the direction of increase in flux 504 developed in each winding's rung 506 is opposite from the other; and the resulting flux generally flows around the square as shown. Some small leakage flux also flows as shown in dotted lines 508, but since the permeability of the core is generally much higher than that of the medium outside the core (e.g., air), flux 504 chooses core 500 as the permeability path. As a result of the flux following a higher permeability path, the net inductance seen at each winding 502 with this excitation is higher, and thus the net current ripple is lower. According to specific implementations described below, the magnetizing inductance, Lm, of each winding is preferably much higher than the leakage inductance, Ll, of either of the windings; such implementations approaching the zero ripple condition as the ratio Lm/Ll (also referred to herein as σ) approaches infinity, i.e., "perfect" coupling. However, even though Lm is preferably at least about three times Ll, embodiments are contemplated in which this ratio, Lm/Ll, may be even lower, as even poor coupling can, in some cases, reduce current ripple significantly.

For applications in which large currents are required, it may be useful to have two or more power stages implemented as described herein in parallel to distribute the current load. The operation of these parallel power stages (each of which includes two converters operating about 180 degrees out of phase with each other) would typically be "interleaved" such that their respective switching waveforms are out of phase with each other by about 360/2N degrees, i.e., substantially evenly distributed over 360 degrees of phase, where N is the number of parallel power stages. For this reason, the parallel interleaved power stages are often referred to as "phases" of the DC-DC converter. For example, where there are two phases in parallel, the phases operate about 90 degrees out of phase with each other; for three, about 60 degrees; and so on.

And as with the embodiments discussed above with reference to FIGS. 4 and 5, implementations having multiple phases in parallel may extend the benefits of ripple cancellation to each phase's inductor windings and power switches through the use of coupled inductors. One such embodiment is illustrated by DC to DC converter 600 of FIG. 6. In the depicted embodiment, each phase 602-1 through 602-N may be implemented as discussed above with reference to the implementations depicted in FIGS. 1-5. And as shown, the inductors associated with each phase are magnetically coupled with all of the inductors for all of the parallel phases.

Figure 7:
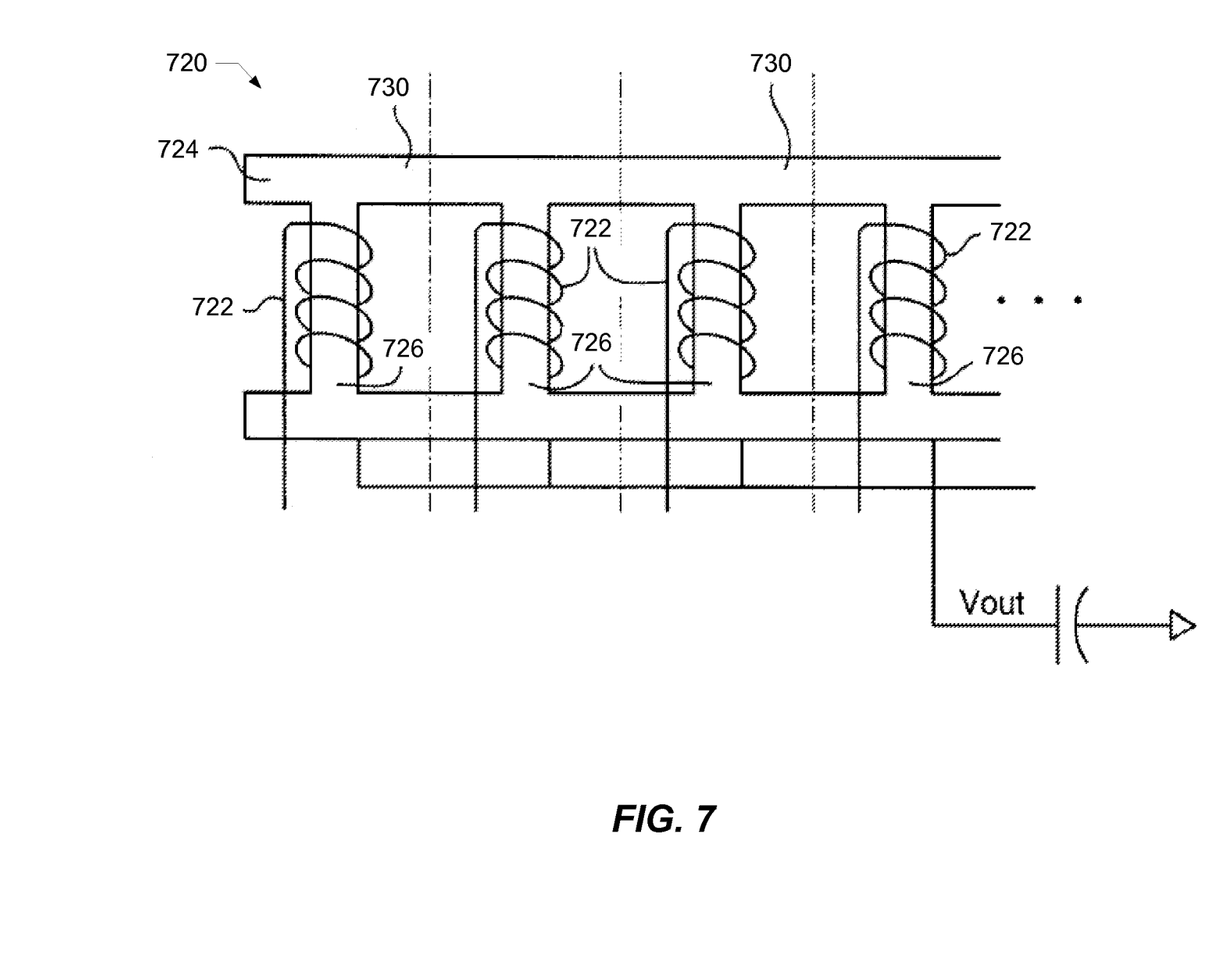
FIG. 7 is a simplified representation of another example of magnetically coupled inductors that may be employed with specific embodiments.

FIG. 7 shows a coupled magnetic structure 720 with more than two windings 722 on a common core 724, each winding corresponding to one of a plurality of parallel phases. Core 724 is in a "ladder" configuration with a plurality of "rungs" 726 coupled with windings 722. In this example, windings 722 are wound with like orientation on rungs 726. It should be understood that the magnetic structures of FIGS. 5 and 7 are merely examples of how inductors may be magnetically coupled according to specific embodiments of the invention. As will be appreciated by those of skill in the art, a wide variety of structures and mechanisms may be employed to generate opposing magnetic fluxes in the inductors of parallel phases to achieve current ripple reduction in accordance with various embodiments of the invention. For more information regarding the use of magnetically coupled inductors in parallel phases, please refer to U.S. Pat. No. 6,362,986 for Voltage Converter With Coupled Inductive Windings, and Associated Methods issued on Mar. 26, 2002, the entire disclosure of which is incorporated herein by reference for all purposes. For additional examples of inductor structures that may be used with various embodiments of the invention, please also refer to U.S. Patent Publications No. 2011/0043317 for Low Profile Inductors For High Density Circuit Boards, No. 2011/0035607 for Coupled Inductor With Improved Leakage Inductance Control, No. 2011/0032068 for Coupled Inductor With Improved Leakage Inductance Control, No. 2011/0018669 for Low Profile Inductors For High Density Circuit Boards, No. 2009/0237197 for Method For Making Magnetic Components With M-Phase Coupling, And Related Inductor Structures, No. 2009/0231081 for Voltage Converter Inductor Having A Nonlinear Inductance Value, No. 2009/0179723 for Method For Making Magnetic Components With M-Phase Coupling, And Related Inductor Structures, the entire disclosure of each of which is incorporated herein by reference for all purposes.

Figure 6:
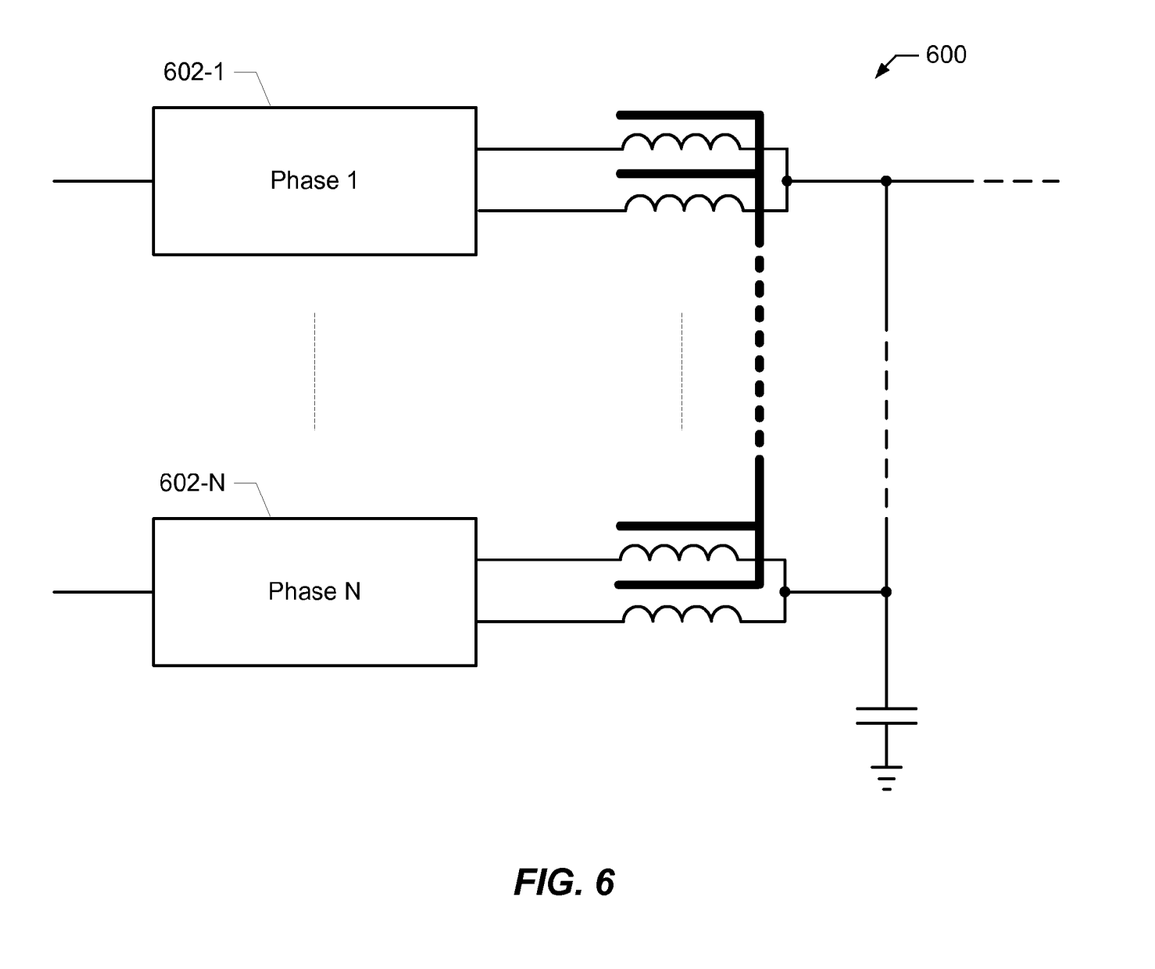
FIG. 6 is a simplified block diagram of a DC to DC converter according to yet another specific embodiment that includes N parallel phases.

It should be noted that the extent to which the benefits of ripple cancellation are enjoyed by embodiments like the one shown in FIG. 6 depends, at least in part, on the manner in which operation of the phases is interleaved over 360 degrees of phases. And as will be understood, such coordinated interleaving may be readily achieved with a single master controller that controls operation of all of the phases. However, there may be some applications in which independent control of parallel phases is required or desirable. Therefore, embodiments are contemplated in which operation of the parallel phases is coordinated and, alternatively, in which operation of the parallel phases is independent. Control circuitry is not shown in FIG. 6 for the sake of simplicity and generality.

Figure 8:
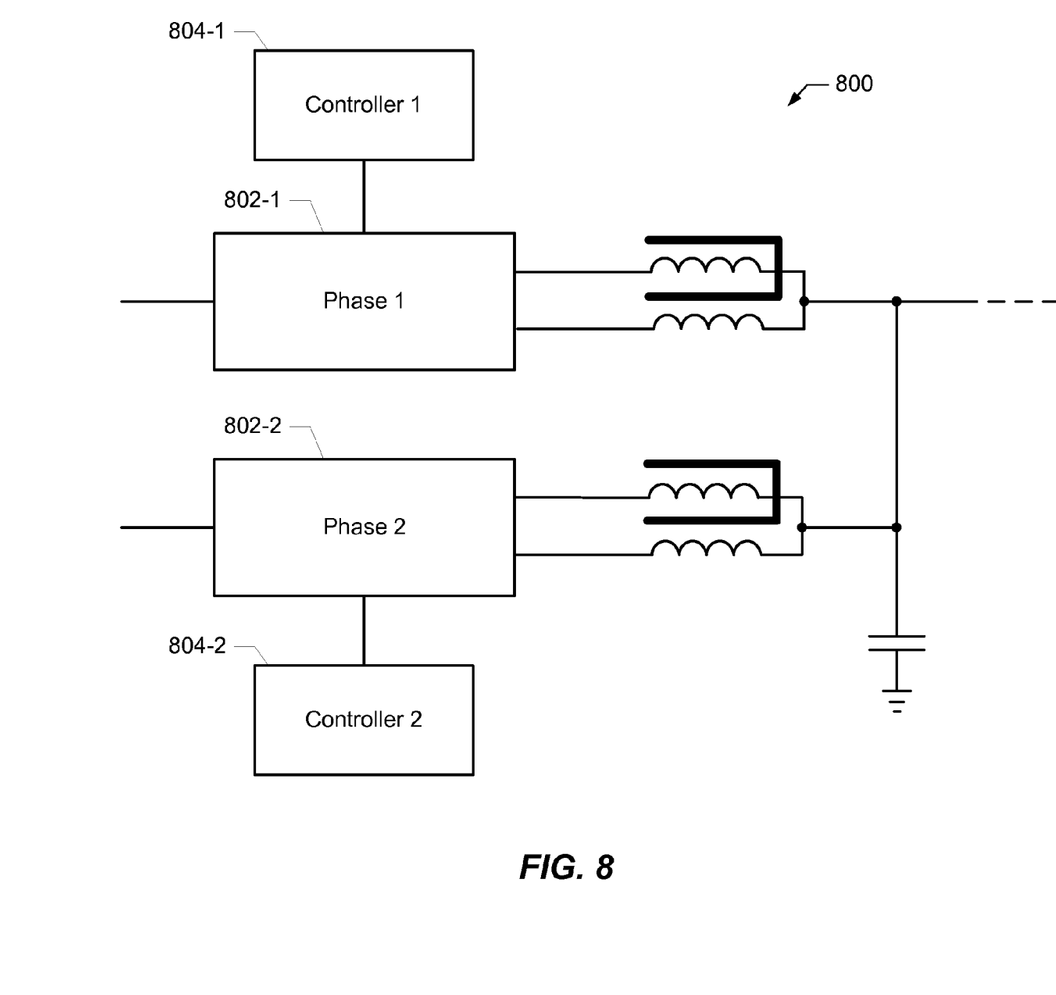
FIG. 8 is a simplified block diagram of a DC to DC converter according to still another specific embodiment that includes two parallel phases.

FIG. 8 shows a DC to DC converter 800 implemented as a two-phase embodiment in which each of the phases 802-1 and 802-2 operates independently under the control of controllers 804-1 and 804-2, respectively. Again, each phase may be implemented as discussed above with reference to the implementations depicted in FIGS. 1-5. Such an approach may seem counterintuitive when considering the goal of ripple cancellation. However, the depicted embodiment is implemented with the understanding that a good portion of the benefit of ripple cancellation is achieved with two phases, i.e., the magnitude of the improvement diminishes with each additional phase. DC to DC converter is also implemented with the understanding that each of its two parallel phases already enjoys the benefit of ripple cancellation as if each were implemented with two phases are operating in parallel. That is, because each of phases 802-1 and 802-2 may be characterized by the interleaved operation of two converters with coupled inductors, the ripple cancellation for each is similar to two conventional phases operating in parallel. This, in turn, allows each phase to be controlled by independent controllers while still enjoying the benefits of ripple cancellation enjoyed by two conventional parallel phases having interleaved operation implemented with a single master controller.

Embodiments of the invention may be implemented using a variety of technologies, discrete components, and integrated circuits, in a variety of combinations. For example, embodiments of the invention are contemplated in which the DC to DC converter is implemented largely with discrete components. Alternatively, embodiments are contemplated in which a combination of discrete components and integrated circuit(s) is employed. According to one class of such embodiments, the high and low-side switches of the two converters are integrated in a single integrated circuit chip with the output filter components and the energy storage tank implemented with discrete components. Other embodiments might integrate some or all of these components with the switches or in other integrated circuit chips. The control electronics which control the switches may also be integrated in the same chip, in a separate chip, or implemented partially or entirely with discrete components. According to more specific embodiments, the high and low-side switches are integrated in a flip-chip integrated circuit chip which is flip-chip mounted on a printed circuit board, an interposer, or other substrate. One such embodiment is shown in FIG. 9.

Figure 9:
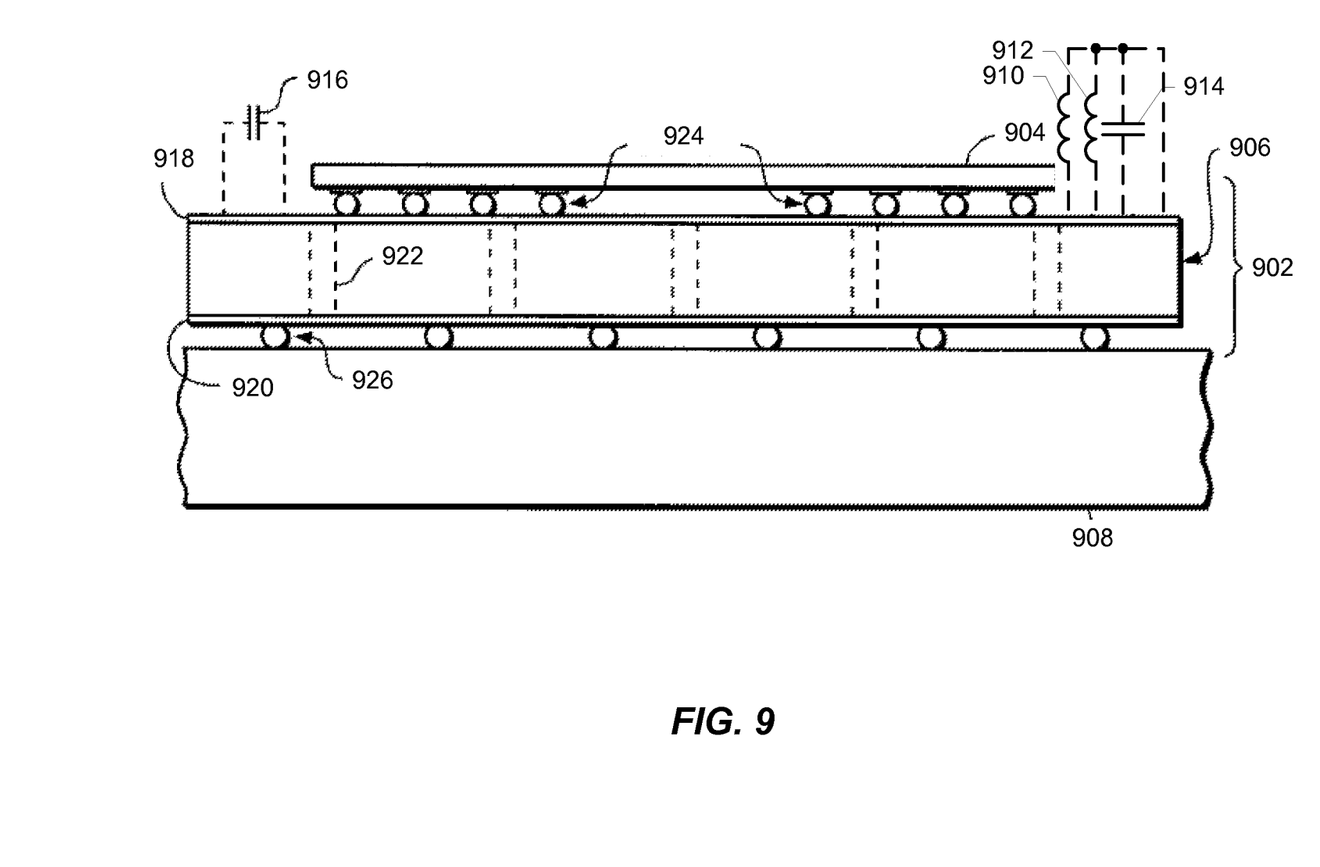
FIG. 9 is a diagram of a DC to DC converter according to a further embodiment.

Referring to FIG. 9, the switching circuitry for the two interconnected converters is fabricated in a flip-chip package 902 that includes an integrated circuit chip 904 (including the high and low-side switches) and a substrate 906, e.g., an interposer board. The flip-chip package 902 is attached to a printed circuit board (PCB) 908. Other components of the DC to DC converter, such as the output filter components (inductors 910 and 912, and output capacitor 914) and the energy storage tank (e.g., tank capacitor 916), are mounted on substrate 906 (as shown). Alternatively, some or all of these components could be mounted on PCB 908.

According to some implementations, current commutation losses can be problematic. In such implementations, any parasitic inductance in the connections of the AC loops that contain tank capacitor 916 are critical. Therefore, tank capacitor 916 is located as near to integrated circuit chip 904 as possible. This may involve placing the capacitor adjacent the chip or even, in some implementations, on top of the chip. And as mentioned above, feedback circuitry and control electronics (not shown) could be implemented in integrated circuit chip 904, in a separate integrated circuit, or using discrete components. According to a particular implementation that is advantageous with regard to current commutation losses, the four switches of the interconnected converters are integrated with at least some control circuitry on a single chip in a flip-chip package, with the tank capacitor placed as near the chip as possible. Such an implementation provides an advantageous combination of small size, high efficiency and low cost.

According to the particular implementation shown in FIG. 9, substrate 906 includes a metallized top signal layer 918 which faces chip 904, a metallized bottom signal layer 920 on the side of substrate 906 opposite the side facing chip 904, and vias 922 (shown in phantom) that connect top signal layer 918 to bottom signal layer 920. Substrate 906 may also include one or more intervening signal layers between signal layers 918 and 920. Integrated circuit chip 904 is connected to top signal layer 918 of substrate 906 by bumps 924 (which may be bumps, balls, pillars, etc.) constructed from a wide variety of suitable materials (e.g., silver, aluminum, copper, brass, an alloy of lead and tin, or another metal or metal alloy). Bottom signal layer 920 of substrate 906 is connected to PCB 908 by additional bumps 926 (which may be similar to or different from bumps 924). For additional information regarding flip-chip technology that may be employed with various embodiments of the invention, please refer to U.S. Pat. No. 6,278,264 for Flip-Chip Switching Regulator issued Aug. 21, 2001, the entire disclosure of which is incorporated herein by reference for all purposes.

While the invention has been particularly shown and described with reference to specific embodiments thereof, it will be understood by those skilled in the art that changes in the form and details of the disclosed embodiments may be made without departing from the spirit or scope of the invention. For example, at least some of the embodiments described above contemplate that the voltage across the energy storage tank in series with the high and low-side switches balances at Vin/2. However, it should be noted that operable embodiments are contemplated that employ different balance points. While such embodiments may not enjoy all of the benefits of the described embodiment (e.g., they may experience degraded ripple cancellation, voltage and current stress imbalance, etc.), they are still within the scope of the invention.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A DC to DC converter for converting an input voltage, Vin, to an output voltage, Vout, the DC to DC converter comprising first and second converters, the first converter having a modified Buck topology including a first high-side switch, a first low-side switch, and a tank capacitor, the tank capacitor being disposed in between and in series with the first high-side switch and the first low-side switch, the first converter being configured to charge the tank capacitor when the first high-side switch is conducting, the second converter having a Buck topology including a second high-side switch and a second low-side switch, the second converter being configured to discharge the tank capacitor when the second high-side switch is conducting, wherein operation of the first and second converters is non-overlapping, and wherein the first and second converters are interconnected such that each is subjected to an effective input voltage lower than Vin.

2. The DC to DC converter of claim 1 wherein the first converter comprises a first inductor and the second converter comprises a second inductor, and wherein the first and second inductors are magnetically coupled to each other.

3. The DC to DC converter of claim 1 wherein a tank capacitor voltage across the tank capacitor balances at about Vin/2.

4. The DC to DC converter of claim 1 wherein operation of the first and second converters is interleaved such that the first and second converters operate about 180 degrees out of phase.

5. The DC to DC converter of claim 1 wherein the first and second high-side switches and the first and second low-side switches are integrated in a single flip-chip integrated circuit chip.

6. A DC to DC converter for converting an input voltage, Vin, to an output voltage, Vout, the DC to DC converter comprising first and second converters, the first converter having a modified Buck topology including a first high-side switch, a first low-side switch, and an energy storage tank configured to operate at a potential of about Vin/2, the energy storage tank being disposed in between and in series with the first high-side switch and the first low-side switch, the second converter having a Buck topology including a second high-side switch and a second low-side switch, wherein operation of the first and second converters is non-overlapping, and wherein the first and second converters are interconnected such that each is subjected to an effective input voltage of about Vin/2.

7. The DC to DC converter of claim 6 wherein the first converter comprises a first inductor and the second converter comprises a second inductor, and wherein the first and second inductors are magnetically coupled to each other.

8. The DC to DC converter of claim 6 wherein the energy storage tank comprises a tank capacitor or a battery.

9. The DC to DC converter of claim 6 wherein operation of the first and second converters is interleaved such that the first and second converters operate about 180 degrees out of phase.

10. The DC to DC converter of claim 6 wherein the first and second high-side switches and the first and second low-side switches are integrated in a single flip-chip integrated circuit chip.

11. A DC to DC converter for converting an input voltage, Vin, to an output voltage, Vout, the DC to DC converter including N parallel phases, each of the N parallel phases comprising first and second converters, the first converter having a modified Buck topology including a first high-side switch, a first low-side switch, and an energy storage tank configured to operate at a potential of about Vin/2, the energy storage tank being disposed in between and in series with the first high-side switch and the first low-side switch, the second converter having a Buck topology including a second high-side switch and a second low-side switch, wherein operation of the first and second converters of each of the N parallel phases is non-overlapping, wherein the first and second converters of each of the N parallel phases are interconnected such that each is subjected to an effective input voltage of about Vin/2, and wherein conduction intervals of the high-side switches of the respective N parallel phases are substantially evenly distributed over 360 degrees.

12. The DC to DC converter of claim 11 wherein the first converter of each of the N parallel phases comprises a first inductor and the second converter of each of the N parallel phases comprises a second inductor, and wherein the first and second inductors of each of the N parallel phases are magnetically coupled to each other.

13. The DC to DC converter of claim 12 wherein the inductors of all of the N parallel phases are magnetically coupled to each other.

14. The DC to DC converter of claim 11 wherein the energy storage tank of each of the N parallel phases comprises a tank capacitor or a battery.

15. The DC to DC converter of claim 11 wherein operation of the first and second converters of each of the N parallel phases is interleaved such that the first and second converters of each of the N parallel phases operate about 180 degrees out of phase.

16. The DC to DC converter of claim 11 wherein the first and second high-side switches and the first and second low-side switches in each of the N parallel phases are integrated in a single flip-chip integrated circuit chip.

17. A DC to DC converter for converting an input voltage, Vin, to an output voltage, Vout, the DC to DC converter including two parallel phases, each of the two parallel phases comprising first and second converters, the first converter having a modified Buck topology including a first high-side switch, a first low-side switch, and an energy storage tank configured to operate at a potential of about Vin/2, the energy storage tank being disposed in between and in series with the first high-side switch and the first low-side switch, the second converter having a Buck topology including a second high-side switch and a second low-side switch, the first converter including a first inductor and the second converter including a second inductor, the first and second inductors being magnetically coupled to each other, wherein operation of the first and second converters of each of the two parallel phases is non-overlapping, wherein the first and second converters of each of the two parallel phases are interconnected such that each is subjected to an effective input voltage of about Vin/2, and wherein operation of the two parallel phases is independently controlled.

18. The DC to DC converter of claim 17 wherein the energy storage tank of each of the phases comprises a tank capacitor or a battery.

19. The DC to DC converter of claim 17 wherein operation of the first and second converters of each of the phases is interleaved such that the first and second converters of each of the phases operate about 180 degrees out of phase.

20. The DC to DC converter of claim 17 wherein the first and second high-side switches and the first and second low-side switches in each of the two parallel phases are integrated in a single flip-chip integrated circuit chip.

* * * * *